(12) United States Patent
Yan et al.

(10) Patent No.: US 11,122,646 B2
(45) Date of Patent: Sep. 14, 2021

(54) GAP PERIOD CONFIGURATION

(71) Applicant: Motorola Mobility LLC, Chicago, IL (US)

(72) Inventors: Zhi Yan, Beijing (CN); Xiaodong Yu, Beijing (CN); Haipeng Lei, Beijing (CN); Chenxi Zhu, Beijing (CN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/474,980

(22) PCT Filed: Dec. 28, 2016

(86) PCT No.: PCT/CN2016/112670
§ 371 (c)(1),
(2) Date: Jun. 28, 2019

(87) PCT Pub. No.: WO2018/119756
PCT Pub. Date: Jul. 5, 2018

(65) Prior Publication Data
US 2019/0350039 A1    Nov. 14, 2019

(51) Int. Cl.
*H04B 7/00* (2006.01)
*H04W 76/28* (2018.01)
*H04W 72/04* (2009.01)

(52) U.S. Cl.
CPC ......... *H04W 76/28* (2018.02); *H04W 72/042* (2013.01)

(58) Field of Classification Search
CPC .. H04W 76/02; H04W 76/025; H04W 76/048
USPC ................... 370/310, 328, 329, 345
See application file for complete search history.

(56) References Cited

U.S. PATENT DOCUMENTS

| | | | | |
|---|---|---|---|---|
| 8,423,036 | B2* | 4/2013 | Ahluwalia | H04W 76/28 455/450 |
| 8,837,313 | B2* | 9/2014 | Adachi | H04W 52/0229 370/252 |
| 9,655,093 | B2* | 5/2017 | Chen | H04W 72/1289 |
| 9,999,039 | B2* | 6/2018 | Vajapeyam | H04W 72/1289 |
| 10,104,613 | B2* | 10/2018 | Fukuta | H04W 52/0209 |
| 10,306,671 | B2* | 5/2019 | Li | H04W 72/048 |
| 10,674,508 | B2* | 6/2020 | Zeng | H04J 11/00 |
| 10,834,751 | B2* | 11/2020 | Yi | H04W 72/0446 |

(Continued)

OTHER PUBLICATIONS

PCT/CN2016/112670, "Notification of Transmittal of the International Search Report and the Written Opinion of the International Searching Authority, or the Declaration", International Searching Authority, dated Aug. 29, 2017, pp. 1-11.

(Continued)

*Primary Examiner* — Dmitry Levitan
(74) *Attorney, Agent, or Firm* — Kunzler Bean & Adamson (57) ABSTRACT

Apparatuses, methods, and systems are disclosed for gap period (524, 528, 532, 536) configuration. One apparatus (200) includes a receiver (212) that receives (602) a configuration message. The configuration message includes information that configures one or more gap periods within a transmission period. The apparatus (212) also includes a transmitter (210) that transmits (604) data in the transmission period. The receiver (212) receives (606) a control indication message in the one or more gap periods.

16 Claims, 7 Drawing Sheets

(56) References Cited

U.S. PATENT DOCUMENTS

| | | | | |
|---|---|---|---|---|
| 2015/0327324 | A1* | 11/2015 | Wei | H04W 52/02 |
| | | | | 370/280 |
| 2016/0353394 | A1* | 12/2016 | Tadano | H03F 1/0266 |
| 2017/0245140 | A1* | 8/2017 | Au | H04W 84/00 |
| 2019/0350039 | A1* | 11/2019 | June | H04W 76/28 |
| 2020/0092805 | A1* | 3/2020 | Zhang | H04W 76/28 |

OTHER PUBLICATIONS

Sony, "NB IoT UL Transmission Gaps", 3GPP RAN WG4 Meeting #78-NB-IoT R4-78AH-0117, May 3-4, 2016, pp. 1-6.

Sony, "NB IoT UL Transmission Period and Transmission Gaps", 3GPP TSG-RAN WG4 Meeting #79 R4-164201, May 23-27, 2016, pp. 1-3.

Sony, UL Transmission Gap Duration, 3GPP TSG RAN WG1 Meeting #85 R1-164290, May 23-27, 2016, pp. 1-4.

* cited by examiner

GAP PERIOD CONFIGURATION

FIELD

The subject matter disclosed herein relates generally to wireless communications and more particularly relates to gap period configuration.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Cyclic Prefix ("CP"), Channel State Information ("CSI"), Common Search Space ("CSS"), Downlink Control Information ("DCI"), Downlink ("DL"), Downlink Pilot Time Slot ("DwPTS"), Enhanced Clear Channel Assessment ("eCCA"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Reference Signal ("RS"), Resource Spread Multiple Access ("RSMA"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Transport Block ("TB"), Transport Block Size ("TBS"), Time-Division Duplex ("TDD"), Time Division Multiplex ("TDM"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, NB-PUSCH transmissions, or other transmissions, may have a long duration. The long duration may be due to a large number of repetitions and/or due to time-expansion as a single subcarrier with 3.75 kHz subcarrier spacing. Consequently, the NB-PUSCH transmission may span more than a few seconds (e.g., 4+ seconds) of absolute time.

According to certain configurations, a UE may be expected to maintain a 0.1 ppm frequency synchronization accuracy during a connected mode of operation. While this is possible as the UE may periodically perform tracking and make corrections to drifts in its oscillator due to temperature variations during such prolonged periods based on monitoring of the downlink RS and synchronization signals, such an option may not available at the NB-IoT UEs due to a half-duplex constraint. Even though it may be possible to maintain 0.1 ppm accuracy using certain oscillators with integrated temperature sensors, such assumptions may not be made for NB-IoT devices. Instead, it may be expected that NB-IoT UEs would use less expensive oscillators that may lead to drift rates of the order of 2 ppm in 2 seconds.

In certain configurations, grant-free based uplink transmission may be used. Grant-free based UL non-orthogonal multiple access may have the following characteristics: a transmission from a UE does not need the dynamic and explicit scheduling grant from a gNB; and multiple UEs may share the same time and frequency resources.

In grant-free uplink transmission, a gNB may decide the size of the resource pool for UE grant-free access. With a given resource pool, the collision probability depends on both traffic density and the amount of transmission chances the configured resource pool can provide. Generally, the collision probability is proportional to the traffic density while inverse proportional to the amount of the transmission chances. For long uplink (repetition) transmission, grant-free to grant-based switching may be used since collision probability is larger than with short transmission. Furthermore, in some circumstances, grant-free access for a certain UE may face low performance because of constant collision and/or strong inter-cell interference.

BRIEF SUMMARY

Apparatuses for gap period configuration are disclosed. Methods and systems also perform the functions of the apparatus. In one embodiment, the apparatus includes a receiver that receives a configuration message. In such an embodiment, the configuration message includes information that configures one or more gap periods within a transmission period. The apparatus also includes a transmitter that transmits data in the transmission period. The receiver receives a control indication message in the one or more gap periods.

In one embodiment, the control indication message includes new transmission indication information, transmission physical resource information, transmission pattern information, transmission power information, a reconfiguration message, or some combination thereof. In a further embodiment, the transmission physical resource information includes a time domain physical resource, a frequency domain physical resource, or some combination thereof. In certain embodiments, the transmission pattern information includes a size of transmission data, a redundancy version of transmission data, a modulation and code scheme of transmission data, a number of transmission repetitions, or some combination thereof. In some embodiments, the reconfiguration message includes information that reconfigures the one or more gap periods in the transmission period.

A method for gap period configuration, in one embodiment, includes receiving a configuration message. In such an embodiment, the configuration message includes information that configures one or more gap periods within a transmission period. The method also includes transmitting data in the transmission period. The method includes receiving a control indication message in the one or more gap periods.

In one embodiment, an apparatus includes a transmitter that transmits a configuration message. In such an embodiment, the configuration message includes information that configures one or more gap periods within a reception period. The apparatus also includes a receiver that receives data in the reception period. The transmitter transmits a control indication message in the one or more gap periods.

In one embodiment, the control indication message includes new transmission indication information, transmission physical resource information, transmission pattern information, transmission power information, a reconfiguration message, or some combination thereof. In a further embodiment, the transmission physical resource information includes a time domain physical resource, a frequency domain physical resource, or some combination thereof. In certain embodiments, the transmission pattern information includes a size of transmission data, a redundancy version of transmission data, a modulation and code scheme of transmission data, a number of transmission repetitions, or some combination thereof. In some embodiments, the reconfiguration message includes information that reconfigures the one or more gap periods in the reception period.

A method for gap period configuration, in one embodiment, includes transmitting a configuration message. In such an embodiment, the configuration message includes information that configures one or more gap periods within a reception period. The method also includes receiving data in the reception period. The method includes transmitting a control indication message in the one or more gap periods.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
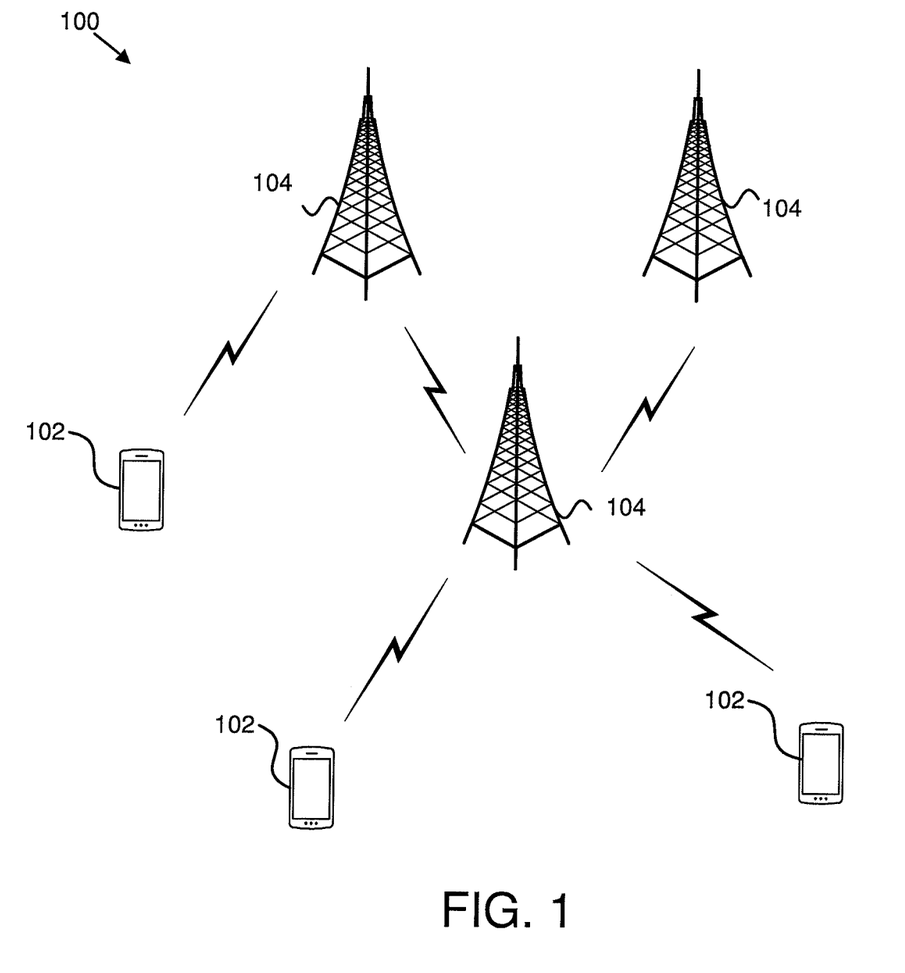
FIG. 1 is a schematic block diagram illustrating one embodiment of a wireless communication system for gap period configuration.

FIG. 1 depicts an embodiment of a wireless communication system 100 for gap period configuration. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle onboard computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the LTE of the 3GPP protocol, wherein the base unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a base unit 104 may transmit a configuration message. The configuration message may include information that configures one or more gap periods within a reception period. As used herein, "gap periods" may be time periods during which data is not received by the base unit 104 from a remote unit 102 (e.g., data is not transmitted by the remote unit 102 and data may be transmitted from the base unit 104 to the remote unit 102). The gap periods may be positioned within a large data transmission to take a break from the data transmission and allow for downlink communication during the break. The base unit 104 may also receive data in the reception period. The base unit 104 may transmit a control indication message in the one or more gap periods. Accordingly, a base unit 104 may be used for gap period configuration.

In another embodiment, a remote unit 102 may receive a configuration message. The configuration message may include information that configures one or more gap periods within a transmission period. As used herein, "gap periods" may be time periods during which data is not transmitted by the remote unit 102 to the base unit 104 (e.g., data is not transmitted by the remote unit 102 and data may be transmitted from the base unit 104 to the remote unit 102). The gap periods may be positioned within a large data transmission to take a break from the data transmission and allow for downlink communication during the break. The remote unit 102 may transmit data in the transmission period. The remote unit 102 may transmit the feedback information for the data block group. The remote unit 102 may also receive a control indication message in the one or more gap periods. Accordingly, a remote unit 102 may be used for gap period configuration.

Figure 2:
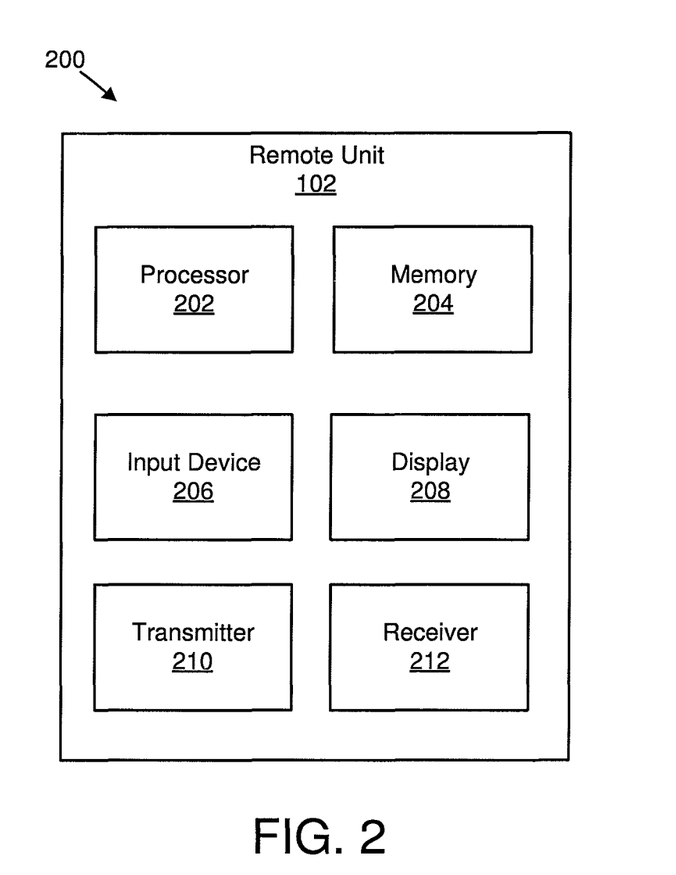
FIG. 2 is a schematic block diagram illustrating one embodiment of an apparatus that may be used for gap period configuration.

FIG. 2 depicts one embodiment of an apparatus 200 that may be used for gap period configuration. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to configurations. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In one embodiment, the transmitter 210 is used to transmit data in a transmission period. In one embodiment, the receiver 212 may be used to receive a configuration message. The configuration message may include information that configures one or more gap periods within the transmission period. In some embodiments, the receiver 212 may be used to receive a control indication message in the one or more gap periods. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
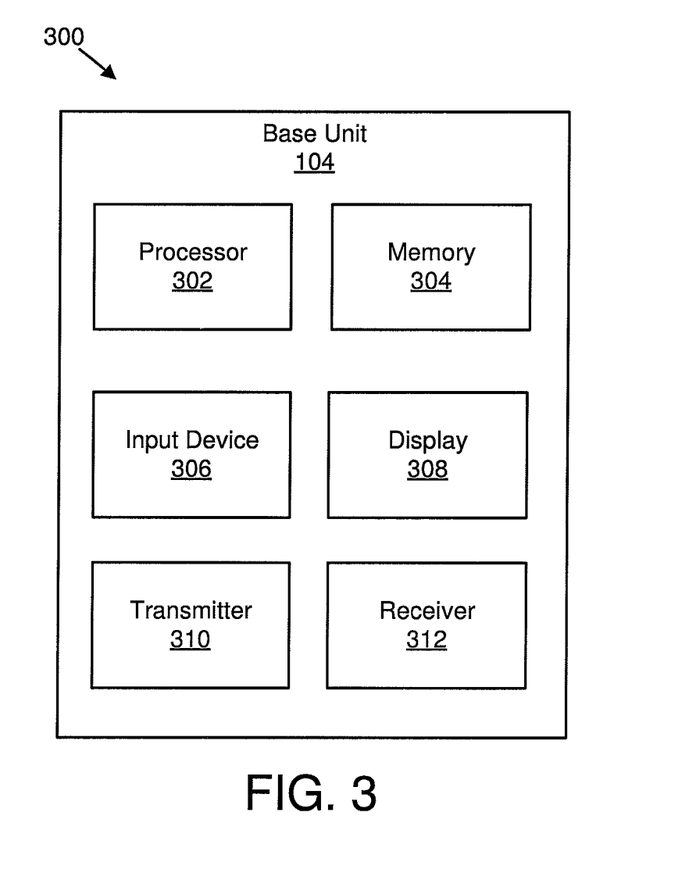
FIG. 3 is a schematic block diagram illustrating one embodiment of an apparatus that may be used for gap period configuration.

FIG. 3 depicts one embodiment of an apparatus 300 that may be used for gap period configuration. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, the transmitter 310 may transmit a configuration message. The configuration message may include information that configures one or more gap periods within the transmission period. In various embodiments, the receiver 312 may receive data in the reception period. In certain embodiments, the transmitter 310 may transmit a control indication message in the one or more gap periods. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
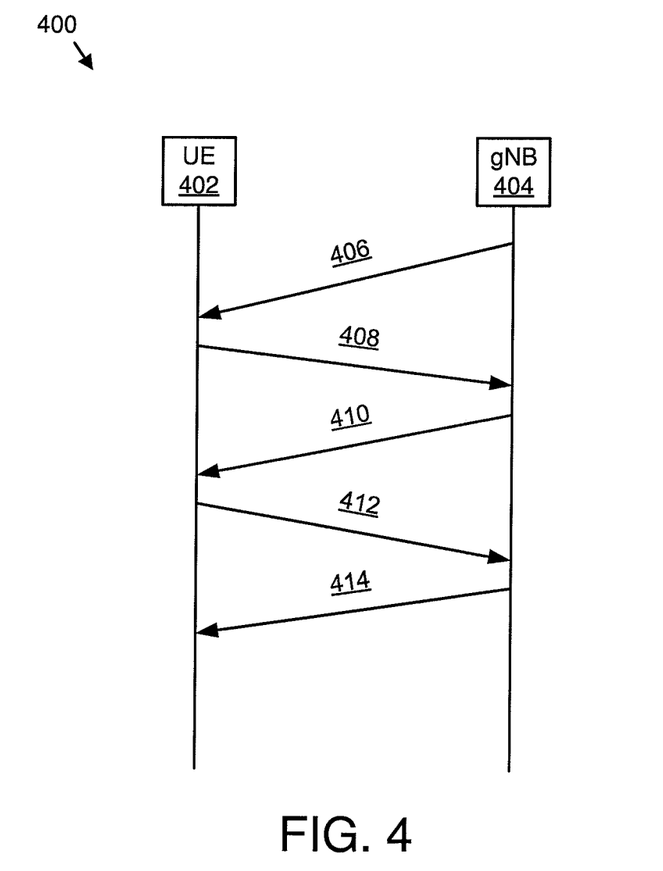
FIG. 4 illustrates one embodiment of communications for gap period configuration.

FIG. 4 illustrates one embodiment of communications 400 for gap period configuration. Specifically, communications 400 between a UE 402 and a gNB 404 are illustrated. A first communication 406 may include a configuration message transmitted from the gNB 404 and received by the UE 402. The configuration message may be transmitted via signaling, such as RRC signaling. In certain embodiments, the communication message may include uplink grant and/or uplink access information with a resource pool. In some embodiments, the resource pool may include a physical resource pool and/or a multiple access resource pool.

In various embodiments, the physical resource pool includes a time assignment, a frequency assignment, a MCS, a TBS, a repetition number, and/or uplink gap configuration parameters. In one embodiment, the gap configuration parameters may be UE specific. In various embodiments, the gap configuration parameters may be specific to a group of UEs. For example, one group of UEs may be configured with the same gap configuration parameters to meet a capacity requirement, such as a capacity requirement for supporting a large number of UEs during a gap duration. In some embodiments, the gap configuration parameters may define a transmission time (e.g., $X_i$ ms) for uplink transmission followed by a gap time (e.g., $Y_i$ ms). As a default condition each $X_i$ for i=1 to n may be substantially equal to one another and/or each $Y_i$ for i=1 to n may be substantially equal to one another. In one embodiment, every $X_i$ ms uplink transmission may have a default frequency and/or timing synchronization tracking. Moreover, in certain embodiments, every other $X_i$ ms uplink transmission may also monitor for ACK/NACK and/or decide whether to switch to grant-based scheduling. In various embodiments, the multiple access resource pool may include a codebook, a codeword, a preamble, a demodulation reference signal, and/or power dimension information.

A second communication 408 includes a transmission from the UE 402 to the gNB 404. In certain embodiments, the second communication 408 may include a grant free uplink transmission. For the second communication 408, the UE 402, in various embodiments, may select a resource pool (e.g., physical resource pool and/or multiple access pool) to start the transmission. In some embodiments, the UE 402 may select the resource pool without scheduling information (e.g., a preamble transmission plus a data transmission with a large repetition). The resource pool selection may be based on a measurement and/or the resource pool selection may be based on the configuration message of the first communication 406.

A third communication 410 includes the UE 402 performing gap processing. In certain embodiments, the gap processing includes receiving a control indication message transmitted from the gNB 404 to the UE 402. The control indication message may be received by the UE 402 during a first gap (e.g., duration $Y_1$). For example, after an $X_1$ ms uplink transmission, the UE 402, during a duration $Y_1$, may switch to DL reception for synchronization, adjusting a physical resource, adjusting a multiple access resource, determine whether to end the current uplink transmission, determining to switch to grant-based scheduling, and/or determine to start a new uplink transmission. The durations $X_1$ and $Y_1$ may be configured by the configuration message of the first communication 406. In some embodiments, determining whether to end a current uplink transmission may be based on a ratio of detected preamble power to noise and/or a number of detected preamble sequences in a same physical resource (e.g., if a number of multiplexing UEs is too many, the transmission may be ended). In various embodiments, the control indication message transmitted from the gNB 404 may adjust the next one or more transmission durations (e.g., duration $X_2$) and/or the next one or more gap durations (e.g., duration $Y_2$) based on a payload state of the gNB 404 (e.g., a load of the gNB 404, a number of UEs communicating with the gNB 404, etc.) and/or a current state of the UE 402. In certain embodiments, the control indication message transmitted from the gNB 404 may adjust the next one or more transmission durations (e.g., duration $X_2$) and/or the next one or more gap durations (e.g., duration $Y_2$) to default values. In one embodiment, the control indication message may include a reference signal for UE synchronization, an uplink transmission indication, and/or an uplink transmission configuration.

A fourth communication 412 includes a continuation of transmission from the UE 402 to the gNB 404. For example, the UE 402 may continue an uplink repetition and/or start a new transmission with a new configuration and/or using a new resource pool.

A fifth communication 414 includes the UE 402 continuing gap processing. In certain embodiments, the gap processing includes receiving a control indication message transmitted from the gNB 404 to the UE 402. The control indication message may be received by the UE 402 during a second gap (e.g., duration $Y_2$). For example, after an $X_2$ ms uplink transmission, the UE 402, during a duration $Y_2$, may switch to gap processing. The durations $X_2$ and $Y_2$ may be configured by the control indication message of the third communication 410. In some embodiments, the gap processing may include the UE 402 switching to DL reception for synchronization, monitoring the ACK/NACK for early termination, adjusting a physical resource, adjusting a multiple access resource, determining whether to end the current uplink transmission, determining to switch to grant-based scheduling, and/or determining to start a new uplink transmission. In certain embodiments, if, during the gap processing, the UE 402 receives an ACK indication, the UE 402 may end a current uplink transmission. This may save power and/or alleviate interference with other UEs in the same physical resource. In some embodiments, during the gap processing, the gNB 404 may schedule the UE 402 to a suitable time and/or frequency resource based on a current physical resource usage, indicate a new uplink transmission, end the current transmission, and/or switch to grant-based scheduling transmission. For example, in certain embodiments, if a multiplexing number of UEs is larger than M, the gNB 404 may indicate to the UE 402 to use frequency hopping to another physical resource in a physical resource pool. In such embodiments, if there are no available physical resources in the physical resource pool, the UE 402 may be switched to scheduling based uplink transmission. In various embodiments, the gNB 404 may adjust the next one or more transmission durations (e.g., duration $X_3$) and/or the next one or more gap durations (e.g., duration $Y_3$) based on a payload state of the gNB 404 (e.g., a load of the gNB 404, a number of UEs communicating with the gNB 404, etc.) and/or a current state of the UE 402. In certain embodiments, the control indication message transmitted from the gNB 404 may adjust the next one or more transmission durations (e.g., duration $X_3$) and/or the next one or more gap durations (e.g., duration $Y_3$) to default values.

Figure 5:
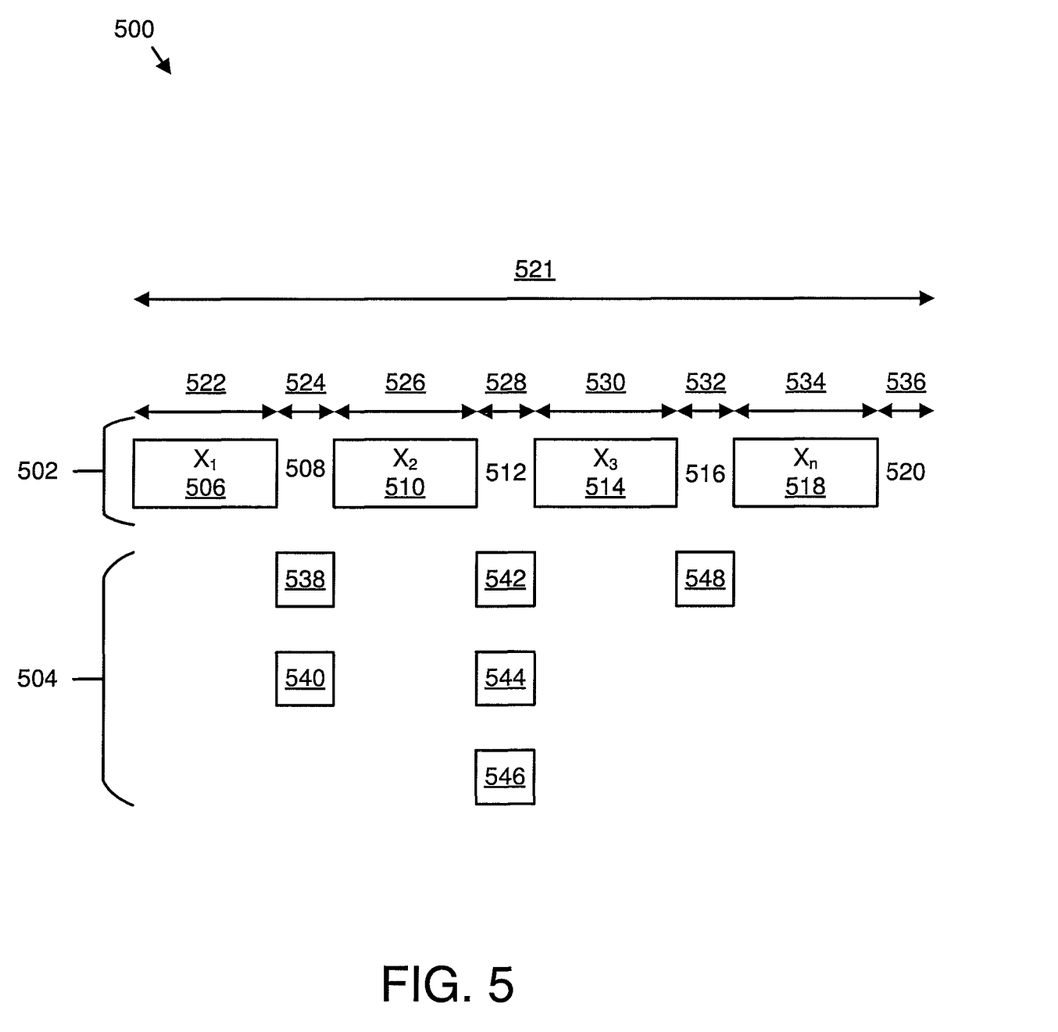
FIG. 5 is a schematic block diagram illustrating one embodiment of communication for gap period configuration.

FIG. 5 is a schematic block diagram illustrating one embodiment of communication 500 for gap period configuration. FIG. 5 illustrates one embodiment of messages, gaps, and timing described in FIG. 4. Specifically, FIG. 5 illustrates one embodiment of uplink transmissions 502 and downlink transmissions 504 communicated via a UE (e.g., the UE 402). The uplink transmissions 502 include a first transmission (e.g., $X_1$) 506, a first gap (e.g., $Y_1$) 508, a second transmission (e.g., $X_2$) 510, a second gap (e.g., $Y_2$) 512, a third transmission (e.g., $X_3$) 514, a third gap (e.g., $Y_3$) 516, an nth transmission (e.g., $X_n$) 518, and an nth gap (e.g., $Y_n$) 520. As may be appreciated, the transmissions and/or the gaps may repeat up to any suitable number n over a transmission period 521 that includes the first transmission 506, the first gap 508, the second transmission 510, the second gap 512, the third transmission 514, the third gap 516, the nth transmission 518, and the nth gap 520.

The first transmission 506 occurs during a first duration 522, the first gap 508 occurs during a second duration 524, the second transmission 510 occurs during a third duration 526, the second gap 512 occurs during a fourth duration 528, the third transmission 514 occurs during a fifth duration 530, the third gap 516 occurs during a sixth duration 532, the nth transmission 518 occurs during a seventh duration 534, and the nth gap 520 occurs during an eighth duration 536. Each of the durations may be configured by the gNB 404 via the configuration message and/or one or more control indication messages. As used herein, the terms "gap" and "gap period" may have substantially the same meaning.

The downlink transmissions 504 occur during the first gap 508, the second gap 512, the third gap 516, and the nth gap 518 of the transmission period 521. The downlink transmissions 504 may include any of the information described in relation to FIG. 4 and/or any suitable information. Specifically, in one embodiment, the first gap 508 may include a first time and/or frequency tracking message 538 (e.g., this may be used to synchronize time and/or frequency). Furthermore, in certain embodiments, the first gap 508 may include a determination about whether to trigger a new uplink transmission 540. For example, a trigger for a new uplink transmission 540 may be made if multiple preambles are detected and there are too many multiplexing UEs on a same resource, or if a ration of preamble power to noise (e.g., interference) is not large enough (e.g., depending on a gNB implementation).

In some embodiments, the second gap 512 may include a second time and/or frequency tracking message 542. In various embodiments, the second gap 512 may include an ACK/NACK message 544. In one embodiment, the ACK/NACK message 544 may be used to facilitate early termination of a transmission that is not being received properly in response to the ACK/NACK message 544 including a NACK. In certain embodiments, the second gap 512 may include a message indicating a resource adjustment 546. In various embodiments, the resource adjustment 546 may include a transmission of physical resource pool scheduling, a reconfiguration of a physical resource pool, an adjustment to a physical resource pool, and so forth. In some embodiments, the resource adjustment 546 may facilitate frequency hopping to result in frequency diversity and balance a load handled by the gNB 404. In various embodiments, the resource adjustment 546 may include timing domain transmission to reduce congestion and balance the load handled by the gNB 404. In certain embodiments, the resource adjustment 546 may include an adjustment to the multiple access resource pool. This may facilitate power control in response to the UE 402 not having maximum power transmission. In one embodiment, the third gap 516 may include a third time and/or frequency tracking message 548.

Figure 6:
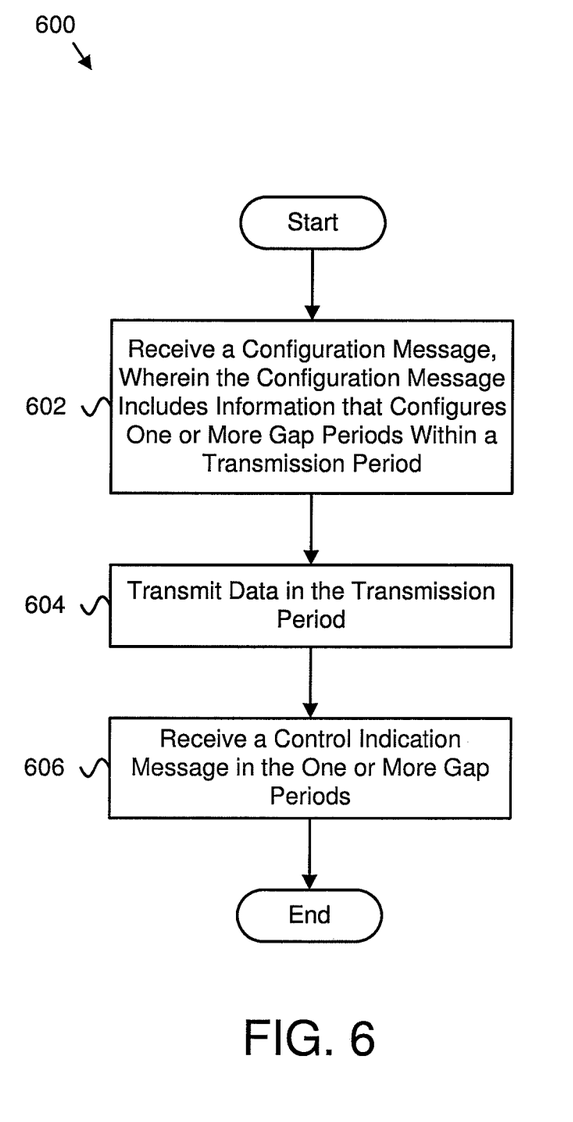
FIG. 6 is a schematic flow chart diagram illustrating one embodiment of a method for gap period configuration.

FIG. 6 is a schematic flow chart diagram illustrating one embodiment of a method 600 for gap period configuration. In some embodiments, the method 600 is performed by an apparatus, such as the base unit 104 or the remote unit 102. In certain embodiments, the method 600 may be performed by a processor executing program code, for example, a microcontroller, a microprocessor, a CPU, a GPU, an auxiliary processing unit, a FPGA, or the like.

The method 600 may include receiving 602 a configuration message. In certain embodiments, the configuration message includes information that configures one or more gap periods within a transmission period. The method 600 also includes transmitting 604 data in the transmission period.

In one embodiment, the method 600 includes receiving 606 a control indication message in the one or more gap periods. In one embodiment, the control indication message includes new transmission indication information, transmission physical resource information, transmission pattern information, transmission power information, a reconfiguration message, or some combination thereof. In a further embodiment, the transmission physical resource information includes a time domain physical resource, a frequency domain physical resource, or some combination thereof. In certain embodiments, the transmission pattern information includes a size of transmission data, a redundancy version of transmission data, a modulation and code scheme of transmission data, a number of transmission repetitions, or some combination thereof. In some embodiments, the reconfiguration message includes information that reconfigures the one or more gap periods in the transmission period.

Figure 7:
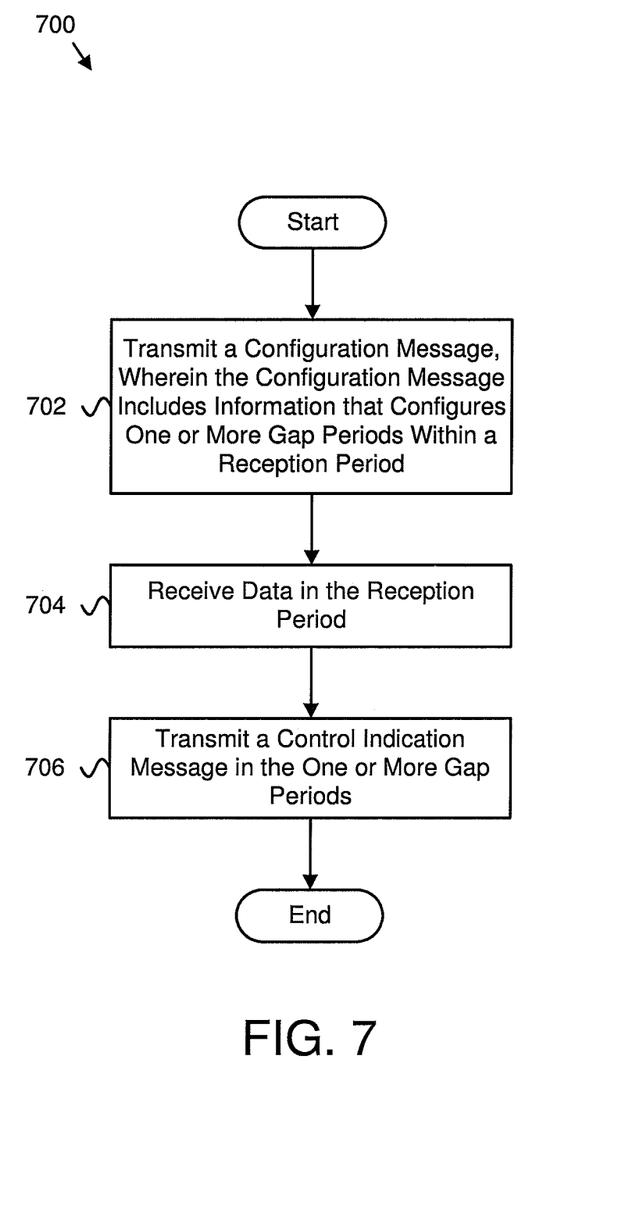
FIG. 7 is a schematic flow chart diagram illustrating another embodiment of a method for gap period configuration.

FIG. 7 is a schematic flow chart diagram illustrating one embodiment of a method 700 for gap period configuration. In some embodiments, the method 700 is performed by an apparatus, such as the remote unit 102 or the base unit 104. In certain embodiments, the method 700 may be performed by a processor executing program code, for example, a microcontroller, a microprocessor, a CPU, a GPU, an auxiliary processing unit, a FPGA, or the like.

The method 700 may include transmitting 702 a configuration message. In some embodiments, the configuration message includes information that configures one or more gap periods within a reception period. The method 700 also includes receiving 704 data in the reception period. The method 700 includes transmitting 706 a control indication message in the one or more gap periods.

In one embodiment, the control indication message includes new transmission indication information, transmission physical resource information, transmission pattern information, transmission power information, a reconfiguration message, or some combination thereof. In a further embodiment, the transmission physical resource information includes a time domain physical resource, a frequency domain physical resource, or some combination thereof. In certain embodiments, the transmission pattern information includes a size of transmission data, a redundancy version of transmission data, a modulation and code scheme of transmission data, a number of transmission repetitions, or some combination thereof. In some embodiments, the reconfiguration message includes information that reconfigures the one or more gap periods in the reception period.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising a user equipment, wherein the apparatus comprises:
   a receiver that receives a configuration message from a base station, wherein the configuration message comprises information that configures one or more gap periods within a transmission period; and
   a transmitter that transmits data to the base station in the transmission period, wherein:
   the receiver further receives a control indication message from the base station in the one or more gap periods;
   the control indication message comprises information indicating whether data transmitted in the transmission period is to switch between a grant-free transmission and a grant-based transmission; and
   the control indication message comprises transmission pattern information comprising a size of transmission data, a redundancy version of transmission data, a modulation and code scheme of transmission data, a number of transmission repetitions, or some combination thereof.

2. The apparatus of claim 1, wherein the control indication message comprises new transmission indication information, transmission physical resource information, transmission power information, a reconfiguration message, or some combination thereof.

3. The apparatus of claim 2, wherein the transmission physical resource information comprises a time domain physical resource, a frequency domain physical resource, or some combination thereof.

4. The apparatus of claim 2, wherein the reconfiguration message comprises information that reconfigures the one or more gap periods in the transmission period.

5. A method performed at a user equipment, the comprising:
   receiving a configuration message from a base station, wherein the configuration message comprises information that configures one or more gap periods within a transmission period;
   transmitting data to the base station in the transmission period;
   receiving a control indication message from the base station in the one or more gap periods, wherein the control indication message comprises information indicating whether data transmitted in the transmission period is to switch between a grant-free transmission and a grant-based transmission, and the control indication message comprises transmission pattern information comprising a size of transmission data, a redundancy version of transmission data, a modulation and code scheme of transmission data, a number of transmission repetitions, or some combination thereof.

6. The method of claim 5, wherein the control indication message comprises new transmission indication information, transmission physical resource information, transmission power information, a reconfiguration message, or some combination thereof.

7. The method of claim 6, wherein the transmission physical resource information comprises a time domain physical resource, a frequency domain physical resource, or some combination thereof.

8. The method of claim 6, wherein the reconfiguration message comprises information that reconfigures the one or more gap periods in the transmission period.

9. An apparatus comprising a base station, wherein the apparatus comprises:
   a transmitter that transmits a configuration message to a user equipment, wherein the configuration message comprises information that configures one or more gap periods within a reception period; and
   a receiver that receives data from the user equipment in the reception period, wherein:
   the transmitter further transmits a control indication message to the user equipment in the one or more gap periods;

the control indication message comprises information indicating whether data received in the reception period is to switch between grant-free data and grant-based data; and the control indication message comprises transmission pattern information comprising a size of transmission data, a redundancy version of transmission data, a modulation and code scheme of transmission data, a number of transmission repetitions, or some combination thereof.

10. The apparatus of claim 9, wherein the control indication message comprises new transmission indication information, transmission physical resource information, transmission power information, a reconfiguration message, or some combination thereof.

11. The apparatus of claim 10, wherein the transmission physical resource information comprises a time domain physical resource, a frequency domain physical resource, or some combination thereof.

12. The apparatus of claim 10, wherein the reconfiguration message comprises information that reconfigures the one or more gap periods in the reception period.

13. A method performed at a base station, the method comprising:

transmitting a configuration message to a user equipment, wherein the configuration message comprises information that configures one or more gap periods within a reception period;

receiving data from the user equipment in the reception period;

transmitting a control indication message to the user equipment in the one or more gap periods, wherein the control indication message comprises information indicating whether data received in the reception period is to switch between grant-free data and grant-based data, and the control indication message comprises transmission pattern information comprising a size of transmission data, a redundancy version of transmission data, a modulation and code scheme of transmission data, a number of transmission repetitions, or some combination thereof.

14. The method of claim 13, wherein the control indication message comprises new transmission indication information, transmission physical resource information, transmission power information, a reconfiguration message, or some combination thereof.

15. The method of claim 14, wherein the transmission physical resource information comprises a time domain physical resource, a frequency domain physical resource, or some combination thereof.

16. The method of claim 14, wherein the reconfiguration message comprises information that reconfigures the one or more gap periods in the reception period.

* * * * *